April 26, 1966 A. L. MILLER 3,247,968
SWIMMING POOL WATER DELIVERING AND WITHDRAWAL SYSTEM
Filed July 19, 1962
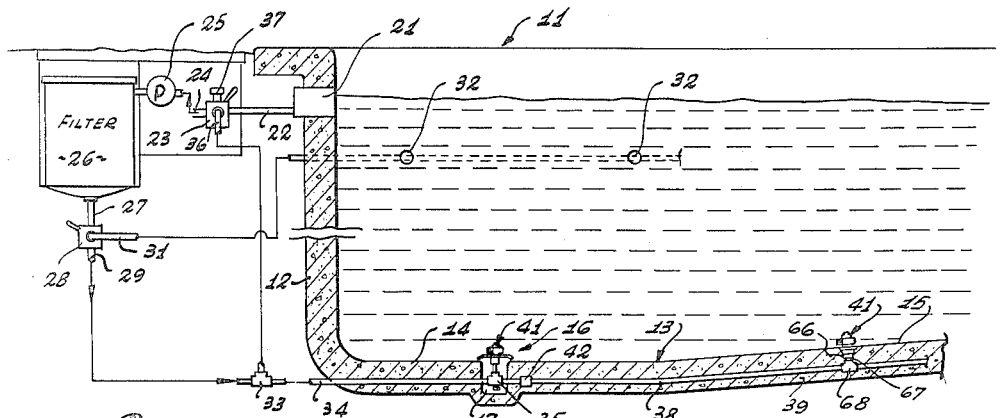
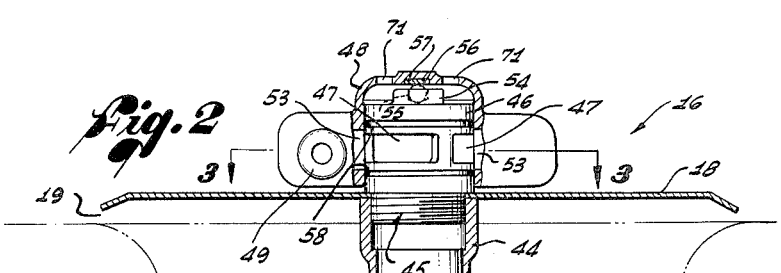
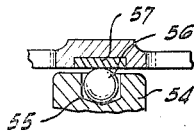
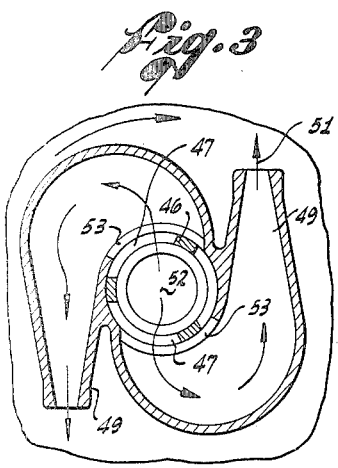
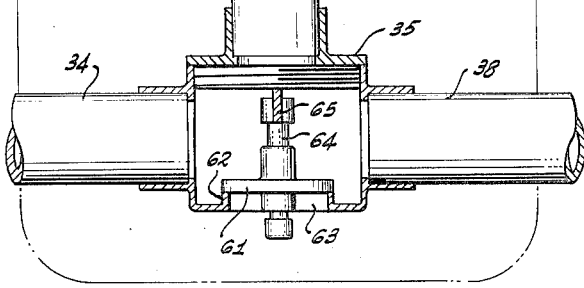
INVENTOR.
AVY L. MILLER
BY *Fulwider Mattingly & Huntley*
ATTORNEYS United States Patent Office 3,247,968
Patented Apr. 26, 1966

3,247,968
SWIMMING POOL WATER DELIVERING AND
WITHDRAWAL SYSTEM
Avy L. Miller, 13246 Saticoy St., North Hollywood, Calif.
Filed July 19, 1962, Ser. No. 210,915
8 Claims. (Cl. 210—136)

The present invention relates generally to swimming pools, and more particularly to apparatus for cleaning the bottoms of swimming pools by selectively withdrawing water from or delivering water over the pool bottoms. This invention is a variation upon and development of the swimming pool invention more broadly and dominantly claimed in applicant's prior copending application, Serial No. 134,474, filed August 28, 1961, for Swimming Pool.

In the operation of artificial swimming pools, dust, dirt, and other contaminating materials are often blown or dropped into the pool. Material having a specific gravity less than water will float on the surface of the pool and may be removed by skimming. Material which goes into solution in the water in the pool may be removed, if desired, by suitable chemical treatment. Material which is in suspension in the water of the pool may be removed by filtration, and to effect this operation the water in the pool is continually or periodically circulated through a filter to remove the suspended material therefrom.

Since the capacity of the filter is necessarily limited, circulation of water therethrough occurs in a flow volume small compared with the total volume of the pool, so that filtration of the entire volume of the pool takes a considerable period of time. The removal of all foreign matter requires an even greater period of time, since the filtered water is returned to the pool after passing through the filter to maintain the pool level substantially constant, so that the suspension in the pool may be looked upon as being constantly diluted by the returning filtered water. During this filtering period and when filtering is interrupted, the heavier particles suspended in the pool water will settle to the bottom of the pool, where they will accumulate as a sediment on the bottom surface. This is particularly true when the pool is not being used by bathers and on those bottom surfaces where bathers do not tread or stir up the settled material.

According to conventional practice in the operation of swimming pools, the foreign matter settling on the bottom of the pool is periodically removed by suction apparatus similar to vacuum cleaners which may be connected to the filter pump. This suction apparatus includes a suction nozzle which is moved across the entire bottom of the pool in an operation similar to the vacuum cleaning of a rug, and the operation consumes a considerable amount of time and involves a shutdown period for the pool.

According to the present invention, material which tends to settle to the bottom of the pool is stirred up during the filtering operation and again placed in suspension in the water of the pool so that it will be drawn off therewith and conducted to the filter for removal.

In the operation of swimming pools in cooler weather, the water of the pool is often heated while being circulated through the filter and returned to the pool to raise the temperature thereof. The present invention also serves to thoroughly mix the incoming heated water with the water in the pool to prevent local hot spots therein.

Further in the operation of swimming pools, it is desired to mix certain chemicals with the water in the pool to inhibit the growth of algae and kill bacteria therein, and the apparatus of the present invention can also be used to secure a more thorough mixture of the inserted chemicals with the water in the pool.

In cleaning the sides of the pool, the surfaces are brushed and the material therefrom collected on the bottom of the pool and may be further brushed toward the pool drain, from whence it is desired to suck the side brushings through the filter for removal. This manner of removal may also be selectively used for other sediment material which is also brushed toward the main drain. Preferably, the same conduit which directs the incoming water to the bottom of the pool is also used to selectively withdraw water from the main drain.

The water inlet means at the bottom of the pool preferably use rotary nozzles which are located entirely above the bottom of the pool so as to avoid the possibility of unbalanced pressures therebeneath and which may be mounted on standard pipe fittings at the bottom surface.

It is, therefore, an object of the present invention to provide a swimming pool with improved means for cleaning the bottom of the pool of foreign matter settling thereon.

Another object of this invention is the provision of an improved rotary nozzle disposed in the circulatory system of a swimming pool to deliver filtered water to the pool across the bottom thereof to stir up settled materials and return them into suspension in the water of the pool.

A still further object of this invention is the provision of an improved rotary nozzle for directing water across the bottom of the pool to stir up settled materials therefrom, which is located entirely above the bottom surface of the pool to equalize the vertical forces other than gravity exerted on the nozzle.

Yet another object of this invention is an improved combination apparatus for both delivering incoming water across the bottom of a swimming pool and for alternatively removing water from the bottom of the pool through the apparatus.

These and other objects and features of the invention will be readily apparent to those skilled in the art from the following specification and the appended drawing of a certain preferred embodiment of the invention, in which:

FIGURE 1 is a vertical sectional view through a swimming pool according to the present invention, with certain parts of the circulatory system shown schematically;

FIGURE 2 is a vertical sectional view through a combined main drain outlet and water inlet means according to the present invention;

FIGURE 3 is a horizontal sectional view on the line 3—3 of FIGURE 2; and

FIGURE 4 is an enlarged detail view of the vertical thrust bearing for the water inlet means.

The swimming pool 11 according to the present invention is more or less diagrammatically shown in FIGURE 1 as comprising a tank 12 of any desired configuration and form; for example, of reinforced concrete cast in forms, built up of preformed bricks or blocks, or of gunite construction. The bottom of the pool or tank at 13 is shown with a deep end horizontal portion 14 and an inclined portion 15 leading to the shallow end of the pool. Alternatively, the deep end portion 14 may be of generally concave construction, with the drain to be hereinafter described located at its deepest point. The pool bottom outlet or drain is indicated generally at 16, preferably disposed in the deepest part of the pool, and includes a sump 17 partially closed at the top by an imperforate, anti-vortex plate 18 providing an annular inlet 19 between its outer edge and the bottom of the pool leading to the sump 17 and through which water is drained from the bottom of the pool.

An outlet for pool water is shown at 21, located at the water surface where it serves to skim floating debris from the pool. Water from the skimmer outlet 21 passes through a pipe 22 to a three-way valve 23 having a single outlet 24 which feeds through a pump 25 to a filter 26 of conventional form. Water leaves the filter 26 through a pipe 27 to a two-way valve 28, which feeds alternately to a pair of pipes 29 and 31. The pipe 31 feeds to a plurality of pool inlets 32 disposed intermediate the top and bottom of the pool. The pipe 29 leads to a T-fitting 33 from which a pipe 34 leads to a second T-fitting 35 within the sump 17.

The three-way valve 23 is preferably provided with three alternate inlets, one at the pipe 22, a second at a pipe 36 leading to the T-fitting 33, and a third at a fitting 37 for attachment to suction apparatus for "vacuuming" the bottom of the pool. A bottom header pipe 38 connected to the T-fitting 35 is embedded in the bottom 39 of the tank 12 and extends therealong for connection to a plurality of water inlets 41 spaced along the bottom of the pool. A check valve 42 is provided in the pipe 38 adjacent to the sump 17 to prevent reverse flow of water through the water inlets and the pipe 38.

From the leg of the T-fitting 35 a supporting and feeding pipe 43 extends upwardly and has secured on its upper end a threaded cup 44 within which is threadedly mounted a nozzle supporting post 45. The supporting post 45 is of inverted cup-shaped construction and has lateral flow openings 47 extending through its cylindrical body 46 which is located above the bottom surface 14. Rotatably mounted over the cylindrical body 46 of the supporting post 45 is an inverted cup-shaped rotor 48 having a pair of nozzles 49 symmetrically disposed thereon for rotation about a vertical axis. The nozzles 49 have their discharge axes, indicated by the arrow 51, offset from the axis of rotation 52. The nozzles 49 communicate through openings 53 in the rotor 48 with the openings 47 in the cylindrical body 46 and thence to the interior of the pipe 43.

The top surface of body portion 46 of the supporting post 45 has an upwardly extending boss 54 thereon having a central pocket 55 therein within which is disposed a hardened stainless steel bearing ball 56. A hardened stainless steel bearing plate 57 is inset in the central under surface of the rotor 48 so as to rest on the ball 56 and provide a vertical thrust bearing for the rotor 48. A pair of O-rings 58 are disposed about the cylindrical body portion 46 above and below the openings 47 to effect seals to the inner surface of the inverted cup-shaped rotor 48.

Within the fitting 35 is mounted a check valve 61 cooperating with a valve seat 62 to close an opening 63 through the fitting. The valve 61 is slidably mounted on a post 64 rigidly secured on a transverse support 65 mounted within the fitting.

All of the water inlets 41 are substantially the same, differing only in the means by which they are mounted; thus, the inlet 41 at the sump 17 serves to mount the antivortex plate 18 between the bottom of its body portion 46 and the top of the cup-shaped fitting 44. The nozzle supporting posts 45 for the other fittings 41 thread into fittings 66 which are flush with the portions 15 of the pool bottom surface where they are disposed. Each fitting 66 connects by a short pipe 67 to a T-fitting 68 in the header pipe 38 through which the inlets are fed.

Where the surfaces of the pool bottom are inclined, as at 15, the pipe 67 is preferably located at right angles to the bottom surface, as shown in FIGURE 1, so that the incoming water will tend to remain in contact with the bottom of the pool to effect washing thereof.

The various outlets and inlets provided for the pool, together with the valves 23 and 28 permit varied cleaning operations which may be carried out on the tank surfaces. In normal operation, water is preferably taken from adjacent the surface of the pool through the skimmer outlet 21 to remove floating debris and, in this operation, the three-way valve 23 is set to connect pipe 22 to the pipe 24 leading through pump 25 to the filter 26. The two-way valve 28 is then set so that the pipe 27 is connected to pipe 29, and water from the filter 26 will therefore flow through pipe 27, valve 28, pipe 29, fitting 33, and pipe 34 to the fitting 35. The check valve 61 is closed under the combined actions of gravity and the pressure within the fitting 35 and the incoming water is supplied to the pipes 43 and 38. Since the check valve 42 is open in this direction, water from the fitting 35 will feed through the header pipe 38 to the pipes 67 and inlets 41 therealong, as well as through pipe 43 to the inlet 41 above the sump 17.

Water from the pipes 43 and 67 will feed through the fittings 44 and 66, respectively, to the nozzle supports 45, from which it flows through the openings 47 and 53 to the nozzles 49. Since the axes 51 of the nozzles 49 are offset from the axis of rotation 52 of the rotor 48, the reaction forces resulting from the ejection of the incoming water from the nozzles exert a turning moment upon the rotor to effect rotation thereof while supported vertically upon the thrust bearing provided by the hardened plate 57 and the bearing ball 56. The water exiting from the nozzles 49 will therefore take a generally spiral path across the bottom surface of the tank 12, as at 14 and 15, to stir up any sediment or foreign material settled to the bottom of the pool and place it again in suspension in the pool water with which it will be drawn off through the skimmer outlet 21 and removed in the filter 26. This is the normal circulatory pattern for the pool to effect automatic cleaning of the bottom of the pool to remove sediment therefrom by the washing action of the incoming water which exits from the nozzles 49. This normal circulatory pattern is from the skimmer outlet 21, through pipe 22, valve 23, pipe 24, pump 25, filter 26, pipe 27, valve 28, pipe 29, fitting 33 and pipe 34 to fitting 35. From the fitting 35 the incoming water divides to pass to pipe 43 and the water inlet 41 thereabove, and also to the header pipe 38 and the water inlets 41 spaced along the bottom of the pool.

It will be noted that with the rotor 48 and the nozzles 49 entirely within the tank 12, the incoming water can exert no vertical force upon the rotor 48, since the water is directed only radially outwardly from the support body portion 46 through the openings 47. The vertical forces on the rotor 48 are substantially balanced, and the rotor is maintained in its assembled position on the supporting post 45 under the action of gravity. Relief holes 71 are provided through the rotor 48 to insure against build-up of pressure thereunder by any leakage through the upper O-ring 58. The weight of the rotor 48 is borne by the bearing ball 56 contacted by the hardened plate 57 to minimize the friction of this vertical thrust bearing.

In addition to its cleaning function by which the foreign matter suspended in the pool water is prevented from settling onto the pool bottom surface, or is washed or stirred up therefrom and placed again in suspension if it has already settled to the bottom, the rotary inlet according to the present invention has obvious advantages in securing more rapid and uniform mixing of the incoming water and of chemicals therein with the water in the pool. For the latter purposes, a heater and a chemical injection trap may be placed in the pipe 27, these elements being conventional and not shown in the drawing since their presence in the pool system is optional.

It will be further apparent that the cleaning area covered by each water inlet will be determined by the velocity of the incoming water from the filter 26, which will in turn be controlled by the capacity of the pump 25 and the loss in head through the system. These will be related to the spacing between the water inlets so as to substantially cover the bottom surface of the pool with washing currents of incoming water to effect the cleaning and mixing actions.

In performing an alternate cleaning operation, particularly when brushing down the side walls of the tank 12 or when otherwise brushing the foreign solid material toward the drain 16, it is desired to take water from the pool at the drain. In this operation a different circulatory pattern will be followed, and here the valve 23 is set to connect the filter inlet pipe 24 to the pipe 36 which is connected through fitting 33 and pipe 34 to the fitting 35 in the sump 17. The valve 28 is now set to connect the filter outlet pipe 27 with the pipe 31 leading to the water inlets in the side of the tank 12. Suction from the pump 25 is thereby applied to the fitting 35, and this raises the valve 61 to uncover the opening 63, and water will be withdrawn from the sump 17 through the opening 63 and pipe 34. Water will therefore flow from the bottom of the pool through the annular opening 19 beneath the anti-vortex plate 18 into the sump 17, bringing with it the foreign material brushed from the surfaces of the tank to the drain.

In this withdrawal of water, the check valve 42 prevents water moving in reverse direction from the pipe header 38. A small amount of water may be withdrawn through the nozzles 49 in the inlet 41 above the pipe 43, but this is relatively minor due to the small size of the nozzle openings. However, if it is desired to cut off even this small amount, a check valve similar to the check valve 42 may be placed in the pipe 43 to prevent flow in the downward direction therethrough. Water withdrawn from the pool drain therefore flows from the bottom of the pool through the annular opening 19 into the sump 17, where it passes through opening 63 into the fitting 35 and flows through pipe 34, fitting 33 and pipe 36 to the valve 23, where it flows through pipe 24 and pump 25 into the filter 26. Water leaving the filter 26 through the pipe 27 passes through the valve 28 to the pipe 31, and is returned to the pool through the side openings 32. After the conclusion of the brush cleaning operation and the removal of the material brushed thereby to the bottom drain, the valves 23 and 28 are preferably reset into the normal circulatory pattern, taking water from the skimmer outlet 21 and returning it to the rotary nozzles of the water inlets 41.

A third circulatory pattern is followed when it is desired to "vacuum" the bottom of the pool by applying a suction device thereto to remove heavy sediment material which cannot be placed in suspension for removal through the skimmer outlet 21. In this operation, the valve 23 is set to connect the filter inlet pipe 24 to the fitting 37, which is ordinarily connected by a flexible hose to a suction device running across the bottom surface 13 of the tank 12. The valve 28 is preferably set to connect the filter outlet pipe 27 to the pipe 31 during this operation, so that the returning water will be fed into the pool through the side inlets 32, rather than through the bottom stirring inlets 41. The circulatory pattern will then be from the suction appliance through the fitting 37, valve 23, filter inlet pipe 24 and pump 25 to the filter 26. From the filter the returning water flows through pipe 27, valve 28 and pipe 31 to the side inlets 32. At the conclusion of the vacuuming operation, the valves 23 and 28 are reset to establish the normal circulatory pattern from the skimmer outlet 21 to the rotary inlets 41.

The valves 23 and 28 have been diagrammatically illustrated in the drawing as being separate and individually manually operable. It will be obvious that they may be interconnected for common movement or incorporated in a single valve mechanism, and may be power operated from a remote source.

While the plurality of rotary water inlets 41 have been shown as connected to the pipe 34 at the same time, it will be understood that means may be provided within the concept of the invention for selectively connecting the water inlets to the supply pipe either singly or in groups, to secure greater flow of water through the connected inlets and coverage of a greater area of the pool bottom surface thereby.

While certain preferred embodiments of the invention have been specifically illustrated and described, it will be understood that the invention is not limited thereto as many variations will be apparent to those skilled in the art, and the invention is to be given its broadest interpretation within the terms of the following claims.

I claim:
1. In a swimming pool, a circulatory system including a water outlet taking water from the pool and a water inlet returning water to the pool; a filter in said circulatory system for removing suspended material from the water passing therethrough; means for circulating pool water through the filter from said outlet to said inlet, said water inlet comprising a hollow supporting post mounted in the bottom of said pool to project a short distance above the bottom surface; a rotary element having a cup-shaped socket fitted over said post; a pair of nozzles symmetrically mounted on said element, the discharge axes of said nozzles being substantially parallel to and adjacent to said bottom surface and being offset laterally from the axis of rotation of said element whereby the forces of reaction to the ejection of water create turning moments to effect rotation of the element; means defining laterally communicating openings in said supporting post and element for passage of water therethrough to said nozzles; and means connecting the interior of said supporting post to said circulating means, said rotary element having openings therethrough freely communicating the space between the top of said supporting post and the under surface of the socket to the water in the pool to insure equalization of the vertical forces on the rotary element thereat.

2. In a swimming pool, a circulatory system including a water outlet taking water from the pool and a water inlet returning water to the pool; a filter in said circulatory system for removing suspended material from the water passing therethrough; means for circulating pool water through the filter from said outlet to said inlet, said water inlet comprising a hollow supporting post mounted in the bottom of said pool to project a short distance above the bottom surface; a rotary element having a cup-shaped socket fitted over said post; a pair of nozzles symmetrically mounted on said element, the discharge axes of said nozzles being substantially parallel to and adjacent to said bottom surface and being offset laterally from the axis of rotation of said element whereby the forces of reaction to the ejection of water create turning moments to effect rotation of the elements; means defining laterally communicating openings in said supporting post and element for passage of water therethrough to said nozzles; sealing means between said supporting post and rotary element disposed both above and below said laterally communicating openings; and means connecting the interior of said supporting post to said circulating means.

3. In a swimming pool, a circulatory system including a water outlet taking water from the pool and a water inlet returning water to the pool; a filter in said circulatory system for removing suspended material from the water passing therethrough; means for circulating pool water through the filter from said outlet to said inlet, said water inlet comprising a hollow supporting post mounted in the bottom of said pool to project a short distance above the bottom surface; a rotary element having a cup-shaped socket fitted over said post; a pair of nozzles symmetrically mounted on said element, the discharge axes of said nozzles being substantially parallel to and adjacent to said bottom surface and being offset laterally from the axis of rotation of said element whereby the forces of reaction to the ejection of water create turning moments to effect rotation of the element; means defining laterally communicating openings in said supporting post and element for passage of water therethrough to said nozzles; means providing interengaging hardened elements at the top of said rotary element socket, said hardened elements being vertically aligned and engaging to provide a vertical thrust bearing for the rotary element; and means connecting the interior of said supporting post to said circulating means.

4. In a swimming pool, a circulatory system including a water outlet taking water from the pool and a water inlet returning water to the pool; a filter in said circulatory system for removing suspended material from the water passing therethrough; means for circulating pool water through the filter from said outlet to said inlet, said water inlet comprising a hollow supporting post mounted in the bottom of said pool to project a short distance above the bottom surface; a rotary element having a cup-shaped socket fitted over said post; a pair of nozzles symmetrically mounted on said element, the discharge axes of said nozzles being substantially parallel to and adjacent to said bottom surface and being offset laterally from the axis of rotation of said element whereby the forces of reaction to the ejection of water create turning moments to effect rotation of the element; means defining laterally communicating openings in said supporting post and element for passage of water therethrough to said nozzles; means providing interengaging hardened elements at the top of said supporting post and on the under surface of said rotary element socket, said hardened elements being vertically aligned and engaging to provide a vertical thrust bearing for the rotary element, one of said hardened elements comprising a bearing plate and the other a cooperating bearing ball; and means connecting the interior of said supporting post to said circulating means.

5. In a swimming pool, a combined outlet drain and water inlet comprising: a sump in the bottom of the pool extending below the bottom surface; a water inlet-outlet pipe leading into said sump; means for selectively applying water pressure or water suction to said inlet-outlet pipe; a fitting located in said sump and having a chamber therein communicating with said inlet-outlet pipe; an opening in said fitting communicating said chamber with said sump; valve means in said fitting located to close said opening and moving to open position in direct response to suction applied to said water inlet-outlet pipe; a pipe communicating with said fitting chamber and extending upwardly from said fitting; and water inlet means above said sump and immediately adjacent the bottom surface of the pool and communicating with said fitting chamber through said last-mentioned pipe.

6. In a swimming pool, a combined outlet drain and water inlet comprising: a sump in the bottom of the pool standing below the bottom surface; a water inlet-outlet pipe leading into said sump; means for selectively applying water pressure or water suction to said inlet-outlet pipe; a fitting located in said sump and having a chamber therein communicating with said inlet-outlet pipe; an opening in said fitting communicating said chamber with said sump; valve means in said fitting normally closing said opening and moving to open position in direct response to suction applied to said water inlet-outlet pipe; a pipe communicating with said fitting chamber and extending upwardly from said fitting and connected to a hollow supporting post projecting a short distance above the bottom surface of the pool; a rotary nozzle mounted on said supporting post for rotation about an axis substantially perpendicular to the bottom surface of the pool, the discharge axis of said nozzle being substantially parallel to and adjacent to said bottom surface and being offset laterally from its axis of rotation whereby the force of reaction to the ejection of water creates a turning moment to effect rotation of the nozzle; and means defining lateral communicating openings in said supporting post and nozzle for passage of water therethrough.

7. In a swimming pool, a combined outlet drain and water inlet comprising: a sump in the bottom of the pool extending below the bottom surface; a water inlet-outlet pipe leading into said sump; means for selectively applying water pressure or water suction to said inlet-outlet pipe; a fitting located in said sump and having a chamber therein communicating with said inlet-outlet pipe; an opening in said fitting communicating said chamber with said sump; valve means in said fitting normally closing said opening and moving to open position in direct response to suction applied to said water inlet-outlet pipe; a supporting pipe communicating with said fitting chamber and extending upwardly from said fitting and carrying a hollow supporting post projecting a short distance above the bottom surface of the pool; a rotary nozzle mounted on said supporting post for rotation about an axis substantially perpendicular to the bottom surface of the pool, the discharge axis of said nozzle being substantially parallel to and adjacent to said bottom surface and being offset laterally from its axis of rotation whereby the force of reaction to the ejection of water creates a turning moment to effect rotation of the nozzle; means defining lateral communicating openings in said supporting post and nozzle for passage of water therethrough; and an anti-vortex plate mounted above said sump and beneath said rotary nozzle.

8. In a swimming pool, a combined outlet drain and water inlet comprising: a sump in the bottom of the pool extending below the bottom surface; a water inlet-outlet pipe leading into said sump; means for selectively applying water pressure or water suction to said inlet-outlet pipe; a fitting located in said sump and having a chamber therein communicating with said inlet-outlet pipe; an opening in said fitting communicating said chamber with said sump; valve means in said fitting normally closing said opening and moving to open position in direct response to suction applied to said water inlet-outlet pipe; a pipe communicating with said fitting chamber and extending upwardly from said fitting and connected to a hollow supporting post projecting a short distance above the bottom surface of the pool; a rotary element having a cup-shaped socket mounted over said supporting post; a plurality of water discharge nozzles symmetrically mounted on said element, the discharge axes of said nozzles being substantially parallel to and adjacent to said bottom surface and being offset laterally from the axis of rotation of said rotary element whereby the forces of reaction to the ejection of water create turning moments to effect rotation of said rotary element; and means defining laterally communicating openings in said supporting post and rotary element for passage of water therethrough to said discharge nozzles.

References Cited by the Examiner

UNITED STATES PATENTS

| | | | |
|---|---|---|---|
| 1,180,170 | 4/1916 | Marsh et al. | 239—259 X |
| 1,785,821 | 12/1930 | Snow | 239—251 X |
| 1,980,065 | 11/1934 | Johnston | 239—251 X |
| 2,128,617 | 8/1938 | Lawlor | 137—592 X |
| 2,332,940 | 10/1943 | Senke | 15—1.7 |
| 2,600,521 | 6/1952 | Swisher | 137—592 |
| 2,938,495 | 5/1960 | Hinton. | |
| 2,979,733 | 4/1961 | St. Clair et al. | 210—169 X |
| 3,018,491 | 1/1962 | Read | 210—169 X |
| 3,045,829 | 7/1962 | Rule et al. | 210—169 |
| 3,091,340 | 5/1963 | Ponsini | 210—354 |

FOREIGN PATENTS

| | | |
|---|---|---|
| 16,917 | 3/1935 | Australia. |
| 7,426 | 5/1888 | Great Britain. |
| 9,548 | 12/1908 | Great Britain. |

REUBEN FRIEDMAN, *Primary Examiner.*

HERBERT L. MARTIN, *Examiner.*

F. W. MEDLEY, *Assistant Examiner.*